(12) United States Patent
Bostwick et al.

(10) Patent No.: US 6,787,949 B2
(45) Date of Patent: Sep. 7, 2004

(54) OPTIMIZED THERMAL SYSTEM FOR AN ELECTRIC MOTOR

(75) Inventors: Peter K. Bostwick, St. Louis, MO (US); Daniel E. Bailey, Valley Park, MO (US); Nathan C. Owen, Florissant, MO (US); Philip S. Johnson, Granite City, IL (US); Barry M. Newberg, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 67 days.

(21) Appl. No.: 10/212,963

(22) Filed: Aug. 5, 2002

(65) Prior Publication Data

US 2004/0027011 A1 Feb. 12, 2004

Related U.S. Application Data

(63) Continuation-in-part of application No. 10/202,195, filed on Jul. 24, 2002.

(51) Int. Cl.$^7$ .................................................. H02K 9/00
(52) U.S. Cl. ............................................ 310/59; 310/89
(58) Field of Search ...................................... 310/59, 89

(56) References Cited

U.S. PATENT DOCUMENTS

| | | | | | |
|---|---|---|---|---|---|
| 3,610,976 A | * | 10/1971 | Wightman | ................ | 310/60 R |
| 4,009,405 A | * | 2/1977 | Gleichman | ................... | 310/58 |
| 4,072,872 A | * | 2/1978 | Gleichman | ................... | 310/53 |

* cited by examiner

Primary Examiner—Thanh Lam

(57) ABSTRACT

The cooling of an electric motor is optimized by the housing of the motor being provided with inlet vent holes that are positioned and sized to increase a total air flow rate through the housing interior and by the interior surface of the housing being shaped to conform to the stator winding end turns of the motor to direct a flow of cooling air around a greater surface area of the winding end turns before being exhausted through outlet vent holes of the housing.

33 Claims, 5 Drawing Sheets

OPTIMIZED THERMAL SYSTEM FOR AN ELECTRIC MOTOR

This application is a continuation-in-part application of application Ser. No. 10/202,195, filed Jul. 24, 2002, and presently pending.

BACKGROUND OF THE INVENTION

1. Field of the Invention

The present invention pertains to a housing for an electric motor having a construction that is optimized to provide cooling for the electric motor. In particular, the present invention pertains to an electric motor housing having vent holes that are positioned and sized to increase a total air flow rate through the housing, an end wall of the housing that is shaped to conform to the stator winding end turns of the motor to optimize cooling of the end turns, and exhaust openings and an exhaust fan that are positioned and configured to improve air flow through the interior of the motor housing and into the fan.

2. Description of the Related Art

In home appliances, the size of an electric motor employed in powering the home appliance is often dictated by the size of the appliance and the area in the home that is designed to accommodate the appliance. For example, in many customized kitchens of homes today the kitchen counters and cabinets are designed with a spacing within the cabinets and beneath the countertop provided to accommodate the home dishwasher. The size of the spacing is primarily dictated by an acceptable kitchen counter height. When considering that it is desirable to have the interior of the home dishwasher be as large as possible to accommodate as many dishes, pots and pans, etc. as possible, the remaining interior volume of the dishwasher left to accommodate the water piping, electrical controls and electric motor of the dishwasher is very limited.

In looking to improve the performance of a home appliance such as a dishwasher, one of the first considerations is to increase the power of the water pump that produces the pressure behind the water jets of the dishwasher. This involves an increase in the size of the motor that drives the pump. However, increasing the size of an electric motor that is confined to a very limited area in the interior of the appliance often leads to problems in adequately cooling the motor. To address this problem, the housing of the electric motor and its exhaust or cooling fan should be specifically designed in order to optimize the rate of air flow through the motor housing and thereby optimize the cooling of the motor contained in the housing.

SUMMARY OF THE INVENTION

The present invention provides a housing construction for an electric motor and an exhaust or cooling fan for the electric motor that are specifically designed to optimize the rate of air flow through the interior of the motor housing and the cooling of the electric motor.

The construction of the electric motor itself is conventional. The motor includes a shaft having a center axis that defines mutually perpendicular axial and radial directions relative to the motor. A pair of bearing assemblies are mounted on the shaft and a rotor assembly is mounted on the shaft intermediate to the bearing assemblies. The rotor is received in the center bore of a stator assembly. The stator assembly has a laminate core surrounding the rotor and a plurality of windings with end turns of the windings projecting axially from the opposite ends of the core. The novel features of the invention are provided on the housing that encloses the motor and on a cooling or exhaust fan mounted on the shaft of the motor.

The motor housing of the invention is basically comprised of a first circular end wall and a second circular end wall that are axially spaced from each other by a cylindrical side wall that extends between the first and second end walls. Together the first and second end walls and the side wall enclose the electric motor in an interior volume of the housing. In the preferred embodiment, the second end wall and the side wall are formed as a single unit. The first end wall has a peripheral edge that is connected to an annular open end of the side wall. The second end wall has an annular collar on its interior surface that receives one of the bearing assemblies mounted on the motor shaft. The first end wall has a shaft opening that receives the second bearing assembly mounted on the motor shaft. A distal end of the motor shaft projects from the shaft opening.

A plurality of inlet vent holes arranged in a circular pattern extend through the second end wall adjacent the outer periphery of the stator winding end turns at that end of the motor. The vent holes pass through the second end wall adjacent the outer periphery of the end wall and continue axially for a length along the side wall of the housing. The area of each vent hole that passes through the housing side wall is larger than the area of each vent hole that passes through the housing second end wall. The shape and positioning of the vent holes optimizes the ingress of air flow into the housing in the area of the motor winding end turns.

The housing side wall is dimensioned to be slightly larger than the stator core providing an annular void in the housing interior between the exterior of the stator core and the interior surface of the side wall. A plurality of ribs extend axially over the side wall interior surface and project radially into the housing interior and engage with the stator exterior surface. The ribs hold the stator in the housing interior and define axial cooling channels between the ribs that are aligned with the inlet vent holes. The annular void between the stator core and the side wall provides a plurality of flow paths through the rib channels for cooling air received into the housing interior through the inlet vent holes.

The first end wall has an annular, concave interior surface. The interior surface closely follows the shape of the stator winding end turns as it extends radially inwardly from the periphery of the first end wall toward the shaft hole at the center of the end wall. This configuration of the first end wall interior surface channels the flow of air from between the stator and the side wall interior surface around the stator winding end turns to optimize cooling of the end turns. The first end wall is also formed with a recessed cavity in its exterior surface. A plurality of outlet vent holes pass through the first end wall in the recessed cavity. The outlet vent holes are arranged in a circle that is smaller than the circle defined by the plurality of inlet vent holes. The plurality of outlet vent holes are also surrounded by the annular, concave interior surface of the first end wall and receive the flow of air channeled around the stator winding end turns by the first end wall interior surface.

The fan is mounted on the distal end of the motor shaft that projects from the shaft opening of the first end wall. The fan has a cylindrical hub mounted to the shaft distal end and a plurality of blades that radiate outwardly from the center hub. Each of the blades has an inner end that is connected with the fan hub and an outer end adjacent to the outer periphery of the first end wall.

The construction of the motor housing optimizes the cooling of the electric motor contained in the housing. Operation of the motor rotates the fan which draws cooling air into the motor housing interior through the inlet vent holes. The larger portions of the inlet vent holes that pass through the housing side wall expose a large portion of the stator winding end turns to the cooling air that enters into the housing interior through the inlet vent holes. The annular void between the exterior of the stator core and the interior surface of the housing side wall and the plurality of axial ribs arranged around the interior surface between the inlet vent holes channel the cooling air over the exterior of the stator core to the axially opposite set of stator winding end turns adjacent the housing first end wall. The annular, concave interior surface of the first end wall directs the flow of cooling air around the stator winding end turns adjacent the housing first end wall and to the outlet vent holes surrounding the center of the housing first end wall. The fan blades draw the cooling air directed through the housing interior out through the outlet vent holes and pushes the exhausted cooling air radially outwardly across the exterior surface of the housing first end wall. Thus, the construction of the electric motor housing described above directs a greater rate of air flow across a greater area of the stator winding end turns and stator core of the electric motor and thereby optimizes cooling of the motor.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

Figure 1:
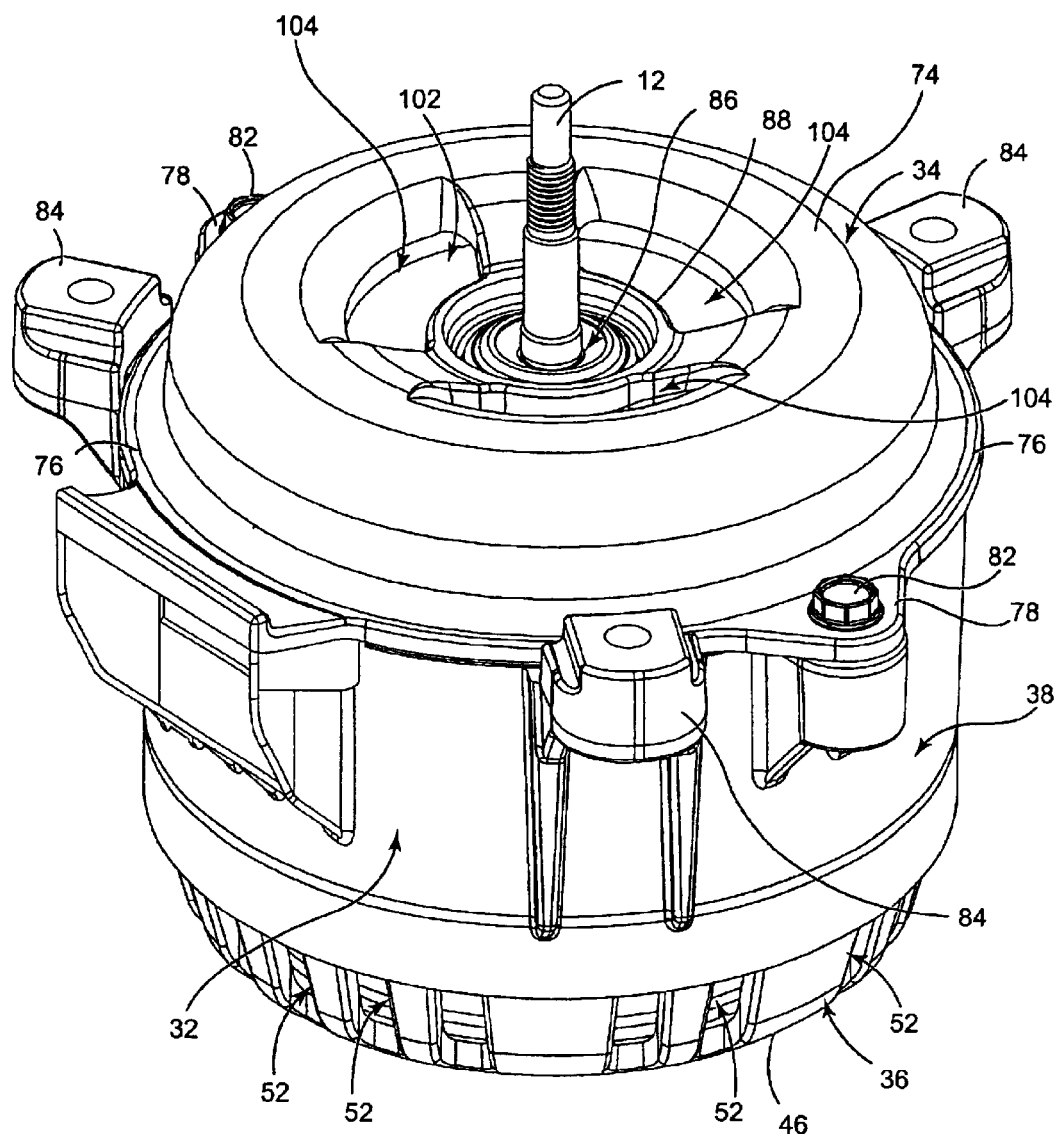
FIG. 1 is a perspective view of the motor housing exterior showing the first housing end wall from which the motor shaft projects.
Figure 2:
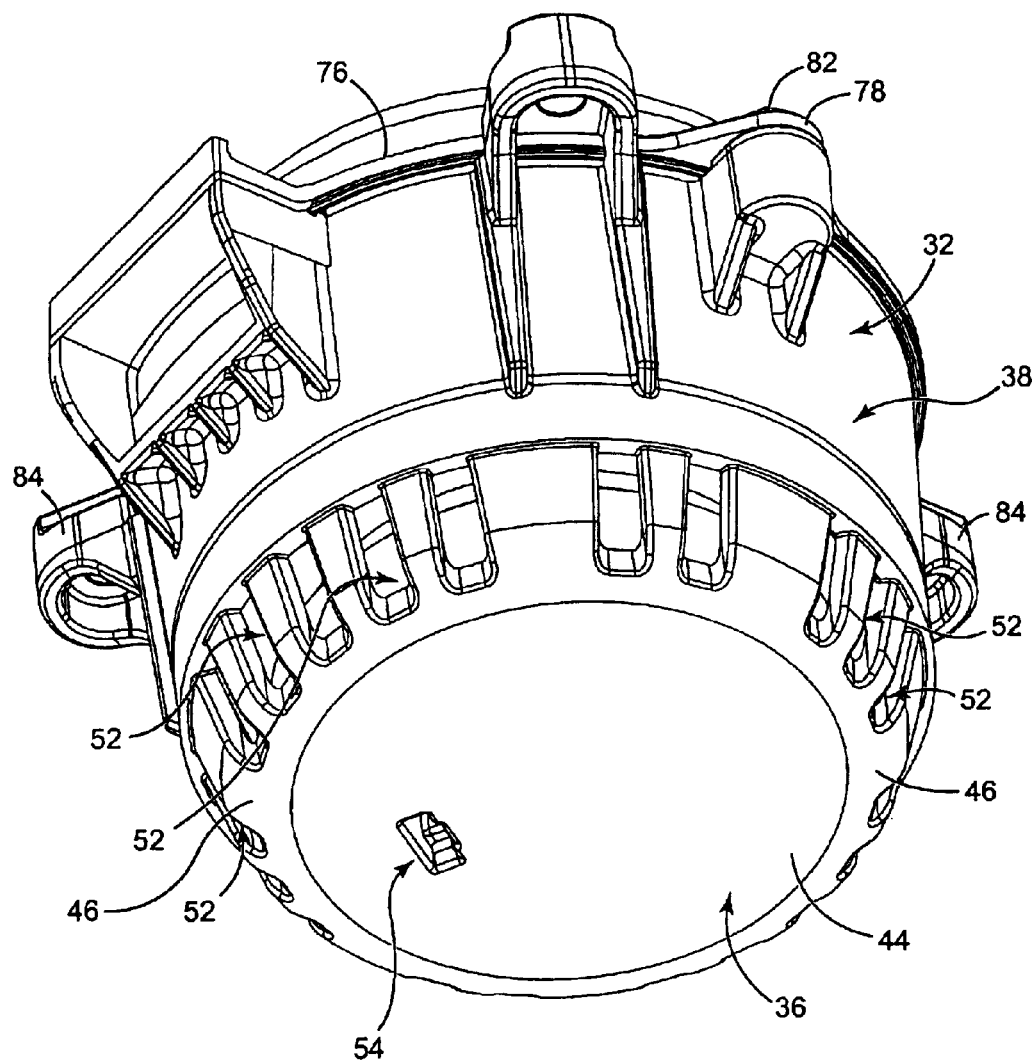
FIG. 2 is a perspective view of the motor housing exterior showing the opposite second end wall of the motor housing.

The present invention provides a housing construction for an electric motor that is specifically designed to optimize the rate of air flow through the interior of the motor housing and optimize the cooling of the electric motor. Although the housing is described as being employed with an electric motor in the illustrated embodiment of the invention to be described, the housing construction may be employed with other types of electrical devices.

The electric motor is of conventional design and therefore will only be described generally. The motor includes a motor shaft (12) having a center axis (14) that defines mutually perpendicular axial and radial directions relative to the motor. A rotor (16) of the electric motor is mounted to an intermediate portion of the shaft (12). A pair of bearing assemblies (18) are mounted to the shaft (12) on opposite sides of the rotor (16). A stator assembly surrounds the rotor and the motor shaft. The stator assembly includes a laminate core (22) having a center bore that receives the rotor (16). Stator windings are wrapped around the core (22) and end turns (24, 26) of the windings project axially from opposite ends of the core. Because the construction of the motor is conventional, its component parts are only shown schematically in the drawing figures.

The novel features of the invention are provided in the construction of the housing that encloses and secures the motor in the housing interior.

The housing (32) is basically comprised of a first generally circular end wall (34), a second generally circular end wall (36) and a generally cylindrical side wall (38) that extends between the first end wall (34) and second end wall (36) and axially spaces the two end walls from each other. Together, the first and second end walls (34, 36) and the side wall (38) enclose an interior volume of the housing that contains the electric motor. In the preferred embodiment of the housing, the second end wall (36) and the side wall (38) are formed as a single unit as shown in the drawing figures. However, the housing could be constructed with the second end wall and side wall being separate component parts that are connected together by threaded fasteners.

Figure 3:
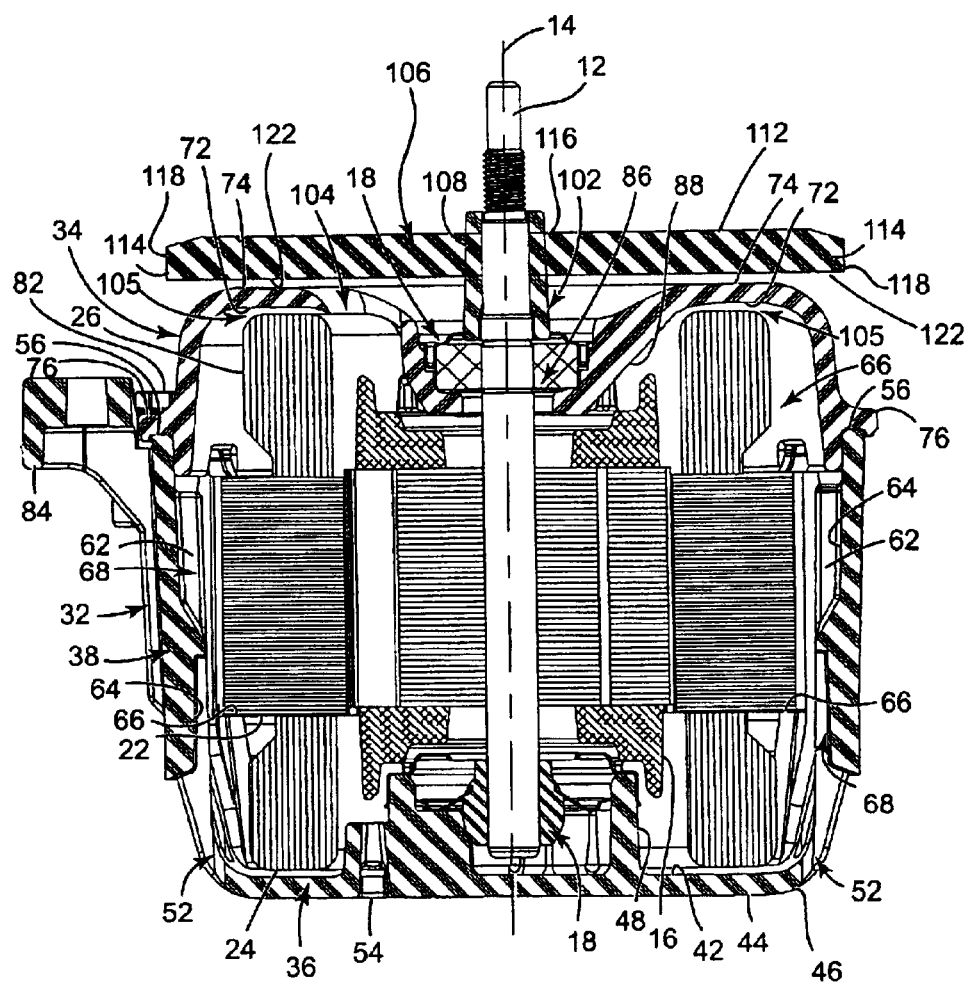
FIG. 3 is a side sectioned view of the motor housing, the motor contained in the housing and the cooling or exhaust fan.
Figure 4:
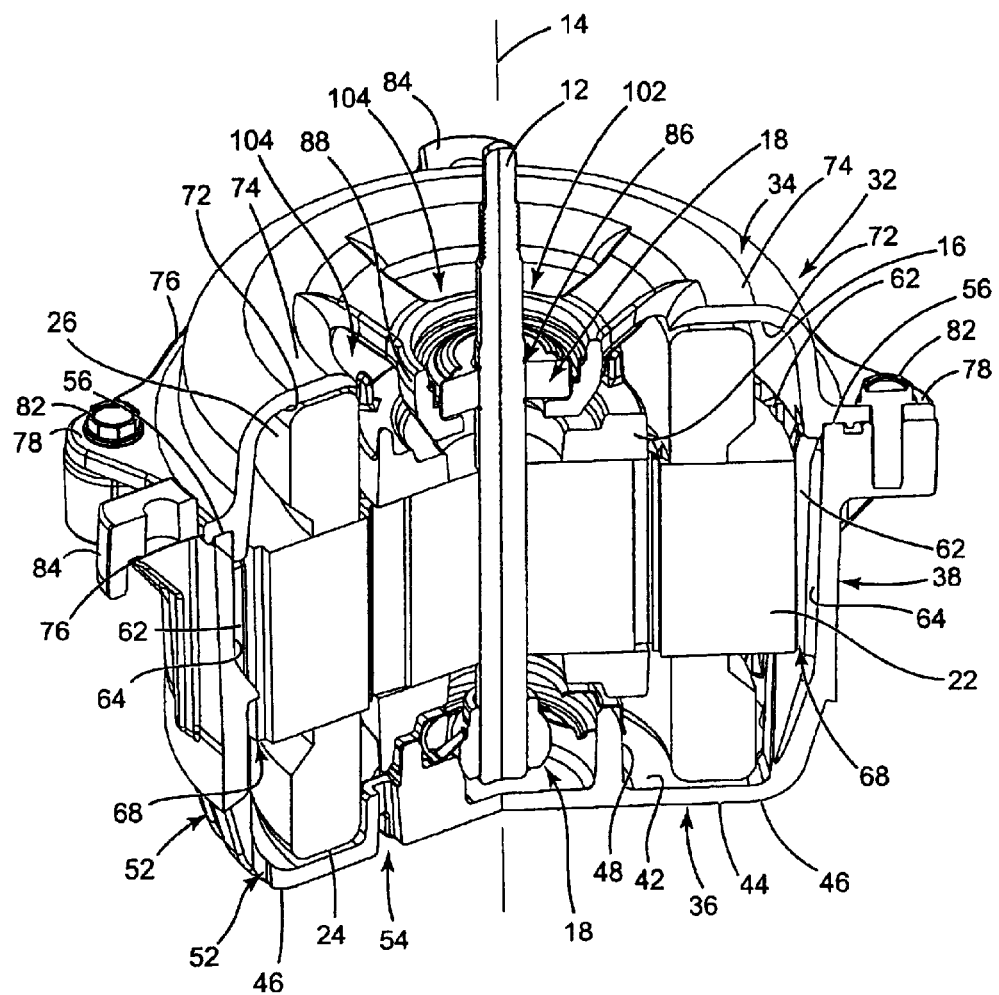
FIG. 4 is a sectioned perspective view of the motor housing and motor.
Figure 5:
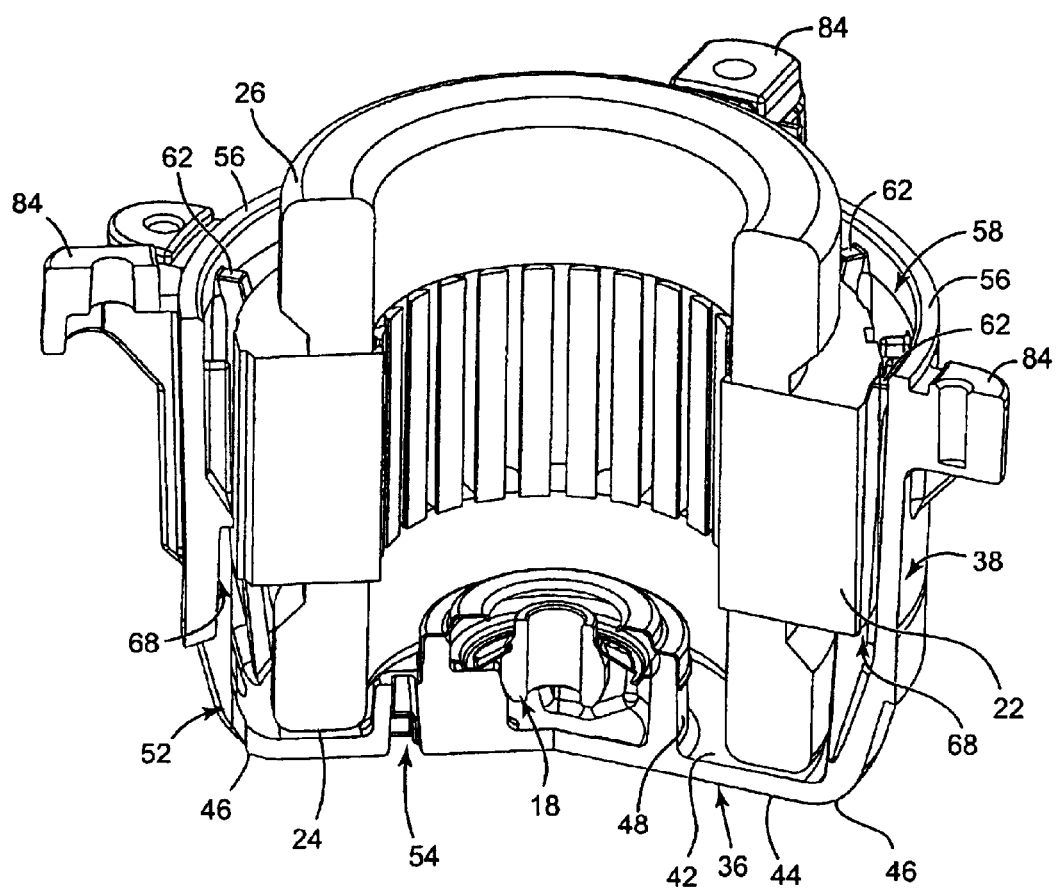
FIG. 5 is a sectioned perspective view of the side wall and second end wall of the motor housing and the motor stator.

The second end wall (36) has opposite interior (42) and exterior (44) surfaces and a peripheral edge (46) that gives the end wall a general circular shape. An annular collar (48) is formed on the end wall interior surface (42). The collar (48) receives one of the bearing assemblies (18) that mount the motor shaft (12) in the housing. As the second end wall (36) extends radially outwardly, it merges into the side wall (38) at the peripheral edge (46) of the end wall. At the merger of the second end wall (36) with the side wall (38), a plurality of inlet vent openings (52) are provided. As can be seen in FIGS. 3 through 5, the inlet vent openings (52) are positioned on the second end wall (36) spaced radially outwardly from the stator winding end turns (24) that are adjacent the second end wall (36). This is due to the requirement that the motor housing have a drip pan at its bottom to catch any plastic parts of the motor that would melt and drip downwardly from the motor if the motor should catch fire. The drip pan is formed by the second end wall interior surface (42). Thus, the requirement of the drip pan at the bottom of the motor limits the area available for vent holes in the second end wall. Apart from a tooling opening (54) that passes through the second end wall (36) away from or radially inside the cooling air flow paths, the plurality of inlet vent openings (52) are the only openings in the second end wall.

The side wall (38) extends axially from its connection with the peripheral edge (46) of the second end wall (38) to an annular edge surface (56) of the side wall. The side wall edge surface (56) surrounds an opening (58) into the interior volume of the housing portion defined by the side wall and the second end wall (36). The components of the motor are inserted through the side wall opening (58) when assembling the motor as shown in FIG. 5. Where the side wall (38) joins with the second end wall (36) around the peripheral edge (46) of the second end wall, the plurality of inlet vent openings (52) that pass through the second end wall (36) extend axially along the side wall (38). From FIG. 3 it can be seen that the area of each inlet vent opening (52) that passes through the side wall (38) is larger than the area of the inlet vent opening (52) that passes through the second end wall (36). This dimensioning of the inlet vent openings (52) provides a large open area for the ingress of cooling air toward the stator winding end turns (24) that are adjacent the second end wall (36) and compensates for the lost area of vent holes in the bottom, second end wall due to the presence of the drip pan.

A plurality of ribs (62) are provided on the interior surface (64) of the side wall (38). The ribs (62) have axial lengths that extend over a portion of the side wall interior surface (64) and project radially inwardly from the side wall interior surface. The ribs (62) engage against the exterior of the stator core (22) and hold the motor in a centered position in the housing interior. Each of the ribs also has a seating ledge (66) that projects radially inwardly from the rib. The plurality of ledges (66) are positioned in a single plane that is perpendicular to the shaft center axis (14). The ledges (66) engage with an underside of the stator core (22) as shown in FIG. 3 and properly position the stator core (22) axially in the housing (32). The ribs (62) also provide a circumferential spacing between the exterior of the stator core (22) and the interior surface (64) of the side wall. As best seen in FIGS. 3 through 5, the circumferential spacing or void between the exterior of the core (22) and the side wall interior surface (64) is comprised of a plurality of air flow channels (68) that extend axially through the void between adjacent ribs (62). Each of the air flow channels (68) is axially aligned with one of the plurality of inlet vent openings (52) that pass through the second end wall (36) and the side wall (38). This allows cooling air that enters into the housing interior through the plurality of inlet vent openings (52) to be routed directly through the air flow channels (68) and pass over the exterior surface of the core (22), exposing a greater area of the stator core to the cooling effect of the air flow.

A channel lip (70) projects radially inwardly from the side wall interior surface (64) in several of the air flow channels (68). The channel lips (70) are spatially arranged around the stator core (22). The channel lips (70) are employed in holding the stator core (22) in an axially stationary position in the interior of the housing as will be explained. It is not necessary that a channel lip (70) be provided in each air flow channel (68), however they could be provided in each channel. As best seen in FIG. 3, the channel lips (70) do not project radially inwardly from the side wall interior surface (64) to the same extent as the ribs (62), leaving a radial spacing between the channel lips (70) and the exterior surface of the stator core (22). Thus, the channel lips (70) do not obstruct the flow of air axially through the air flow channels (68).

The first end wall (34) has opposite interior (72) and exterior (74) surfaces and a peripheral edge (76) that gives the end wall its generally circular configuration. A pair of attachment flanges (78) project radially outwardly from the first end wall peripheral edge (76). The attachment flanges (78) receive threaded fasteners (82) that are employed in attaching the first end wall (34) to the side wall annular edge surface (56) at the peripheral edge (76) of the end wall. A plurality of mounting lugs (84) also project radially outwardly from the first end wall peripheral edge (76). The mounting lugs (84) are employed in mounting the motor to the appliance with which the motor is used.

The first end wall (34) has a shaft hole (86) at its center. The shaft hole (86) is surrounded by an annular collar (88) that receives the second of the bearing assemblies (18) that support the motor shaft (12). As best seen in FIGS. 3 and 4, the first end wall interior surface (72) is an annular concave surface. Referring to FIGS. 3 and 4, the portions of the interior surface (72) have concave shapes that extend around and conform closely to the stator winding end turns (26) at opposite sides of the housing. The concave configuration of the interior surface (72) extends around the shaft axis (14) following the ring of the winding end turns (26) that also extends around the shaft axis. This gives the interior surface (72) its annular, concave shape. Opposite the first end wall interior surface (72), the first end wall exterior surface (74) has an annular, convex shape. The annular, convex exterior surface (74) extends completely around the shaft center axis (14). This gives the exterior surface of the first end wall (34) a recessed cavity (102) at the center of the end wall. The shaft hole (86) is positioned at the bottom of the recessed cavity (102).

A plurality of outlet vent holes (104) pass through the first end wall (34). The outlet vent holes (104) are arranged in a circular pattern in the recessed cavity (102) of the first end wall. The circular pattern of the outlet vent holes (104) is smaller than and positioned inside the circular pattern of the inlet vent holes (52). The outlet vent holes (104) are positioned adjacent the shaft hole (86) and are surrounded by the annular, concave interior surface (72) and the annular, convex exterior surface (74) of the first end wall (34). As the flow path of cooling air extends radially inwardly from the outer periphery of the stator windings (26) toward the outlet vent holes (104), the axial spacing (105) between the stator winding end turns (26) and the first end wall interior surface (72) decreases. This is due to the annular, concave configuration of the first end wall interior surface (72). The squeezing or pinching of the air flow as it travels from the outer periphery of the stator end turns (26) through the tapered or necked down spacing (105) between the end turns (26) and the first end wall interior surface (72) toward the outlet vent holes (104) increases the velocity of the air flow over the end turns (26) and enhances the cooling of the end turns. With the positioning of the outlet vent holes (104) adjacent the shaft hole (86), the stator end turns (26) adjacent the first end wall (34) are positioned radially outwardly from the circular arrangement of the outlet vent holes (104).

The cooling fan (106) is mounted on the portion of the motor shaft (12) projecting from the shaft hole (86). The fan includes a center hub (108) that is mounted to the shaft (12), a circular disc (112) that extends radially outwardly from the hub and a plurality of fan blades (114) that radiate outwardly from the hub beneath the disc. The blades (114) have radially inner ends (116) that are joined to the hub (108) and opposite outer ends (118). On operation of the motor and rotation of the motor shaft (12), the fan (106) is rotated and draws air out of the interior of the housing through the outlet vent holes (104). The curvature of the first end wall exterior surface (74) in the area of the recessed cavity (102) leads the flow of air into the fan from the center of the housing interior. A vacuum is created in the housing interior by rotation of the fan and the vacuum draws cooling air into the housing interior through the plurality of inlet vent openings (52). With the inlet vent openings (52) being positioned immediately adjacent the stator winding end turns (24) at the bottom of the motor as shown in the drawings, the end turns are immediately subjected to the cooling air. The larger area of the inlet vent openings (52) in the housing side wall (38) exposes a larger area of the end turns (24) to the cooling air.

The cooling air is next directed to the circumferential void (66) and axially through the plurality of air flow channels (68) between the exterior of the stator core (22) and the interior surface (64) of the side wall. This flow of air through the circumferential void passes over even more of an area of the stator and further cools the stator.

As the cooling air exits the circumferential void, it is channeled around the stator winding end turns (26) at the top of the motor by the annular, concave interior surface (72) of the first end wall. Because the first end wall interior surface (72) conforms closely to the winding end turns (26), the cooling air passes over a greater area of the end turns as it is directed toward the center of the first end wall (34). The first end wall interior surface (72) directs the cooling air around the end turns and toward the outlet vent holes (104) arranged in the circular pattern around the shaft. Because the outlet vent holes (104) are the only vent holes within the peripheral edge (76) of the first end wall, the entire flow of cooling air is directed around the end turns, thereby enhancing the cooling of the end turns. The cooling air is then drawn out of the housing interior through the outlet vent holes (104) and is pushed radially outwardly across the first end wall exterior surface (74) by the fan blades (102).

In the manner discussed above, the construction of the housing of the present invention enhances the cooling of an electric motor without appreciably increasing the size of the motor.

While the present invention has been described by reference to a specific embodiment, it should be understood that modifications and variations of the invention may be constructed without departing from the scope of the invention defined in the following claims.

What is claimed is:

1. An apparatus with optimized cooling comprising:
an electrical device having a rotating shaft with a center axis, the shaft center axis defining mutually perpendicular axial and radial directions relative to the electrical device;
a housing having an interior volume containing the electrical device, the housing having a first end wall and a second end wall at axially opposite ends of the interior volume and a side wall connected between the first end wall and the second end wall and surrounding the interior volume, the first end wall having opposite interior and exterior surfaces with the interior surface opposing the interior volume of the housing, the interior surface having an annular concave surface and the exterior surface having an annular convex surface.

2. The apparatus of claim 1, further comprising:
the first end wall having a shaft hole and the electrical device shaft passing through the shaft hole, and the annular concave surface and the annular convex surface extending around the shaft hole.

3. The apparatus of claim 1, further comprising:
at least one vent hole passing through the first end wall, the annular concave surface and the annular convex surface extending around the vent hole.

4. The apparatus of claim 2, further comprising:
a plurality of vent holes passing through the first end wall and arranged in a circle around the shaft hole, and the annular concave surface and the annular convex surface extending around the plurality of vent holes.

5. The apparatus of claim 4, further comprising:
the first end wall having a peripheral edge that joins the first end wall to the side wall and there being no additional holes through the first end wall between the plurality of vent holes arranged in the circle and the peripheral edge of the first end wall.

6. The apparatus of claim 1, further comprising:
the electrical device having a stator with axially opposite ends and stator winding end turns at the stator axially opposite ends; and
the annular concave surface being axially aligned with the stator winding end turns at one of the stator opposite ends.

7. The apparatus of claim 1, further comprising:
a plurality of vent holes through the housing, each vent hole passing through the second end wall and through the side wall where the second end wall is connected to the side wall.

8. The apparatus of claim 7, further comprising:
each vent hole having an area of the vent hole passing through the second end wall and an area of the vent hole passing through the side wall and the area of each vent hole passing through the side wall being larger than the area of each vent hole passing through the second end wall.

9. The apparatus of claim 6, further comprising:
a plurality of vent holes through the second end wall of the housing with each vent hole being positioned radially outwardly from the stator winding end turns.

10. The apparatus of claim 9, further comprising:
the stator being spaced radially inwardly from the housing side wall defining an air path between the stator and the side wall and the plurality of vent holes being axially aligned with the air path.

11. An apparatus with optimized cooling comprising:
an electrical device having a rotating shaft with a center axis, the shaft center axis defining mutually perpendicular axial and radial directions relative to the electrical device, and a stator around the shaft, the stator having axially opposite ends and stator winding end turns at the stator axially opposite ends;
a housing having an interior volume containing the electrical device, the housing having a first end wall and a second end wall at axially opposite ends of the interior volume and a side wall connected between the first end wall and the second end wall and surrounding the interior volume, the first end wall and the second end wall supporting the shaft for rotation in the housing, and a plurality of vent holes through the first end wall and arranged in a circle around the shaft with there being no other vent holes through the first end wall other than the plurality of vent holes arranged in the circle.

12. The apparatus of claim 11, further comprising:
the first end wall having a peripheral edge that joins the first end wall to the side wall and there being no additional holes through the first end wall between the plurality of vent holes arranged in the circle and the peripheral edge of the first end wall.

13. The apparatus of claim 11, further comprising:
the first end wall having an exterior surface and an opposite interior surface that faces toward the housing interior volume, and a cavity recessed axially into the first end wall exterior surface with the plurality of vent openings arranged in the circle in the cavity.

14. The apparatus of claim 13, further comprising:
a shaft hole in the first end wall with the plurality of vent holes arranged in the circle around the shaft hole;
the shaft projecting from the housing through the shaft hole; and
a fan mounted on the shaft, the fan having a plurality of blades extending radially outward from the shaft from inner ends of the blades to outer ends of the blades.

15. The apparatus of claim 11, further comprising:
the electrical device having a stator with axially opposite ends and winding end turns at the stator axially opposite ends with the winding end turns at one end of the stator being positioned radially outside of the plurality of vent holes.

16. The apparatus of claim 11, further comprising:
the plurality of vent holes being outlet vent holes;
a plurality of inlet vent holes passing through the housing with each inlet vent hole passing through the second end wall and the side wall where the second end wall is connected to the side wall.

17. The apparatus of claim 16, further comprising:

each inlet vent hole having an area of the inlet vent hole passing through the side wall and an area of the inlet vent hole passing through the second end wall and the area of each inlet vent hole passing through the side wall is larger than the area of each inlet vent hole passing through the second end wall.

18. The apparatus of claim 16, further comprising:

each inlet vent hole being positioned radially outwardly from the winding end turns.

19. The apparatus of claim 16, further comprising:

the electrical device having a stator;

the housing having an interior surface with a plurality of ribs that project radially inwardly from the housing interior surface and engage with the stator holding the stator spaced radially inwardly from the housing side wall, the ribs defining a plurality of axially extending air flow channels between the stator and the side wall and the plurality of inlet vent holes being axially aligned with the plurality of air flow channels.

20. An apparatus with optimized cooling comprising:

an electrical device having a rotating shaft with a center axis, the shaft center axis defining mutually perpendicular axial and radial directions, and a stator around the shaft, the stator having axially opposite ends and stator winding end turns at the stator axially opposite ends;

a housing having an interior volume containing the electrical device, the housing having a first end wall and a second end wall at axially opposite ends of the interior volume and a side wall connected between the first and second end walls and surrounding the interior volume, the first end wall and the second end wall supporting the shaft for rotation in the housing, and a plurality of vent holes through the second end wall with each vent hole passing through the second end wall and the side wall of the housing where the second end wall is connected to the side wall.

21. The apparatus of claim 20, further comprising:

each vent hole having an area of the vent hole passing through the second end wall and an area of the vent hole passing through the side wall and the area of each vent hole passing through the side wall being larger than the area of each vent hole passing through the second end wall.

22. The apparatus of claim 20, further comprising:

each vent hole being positioned radially outwardly from the stator winding end turns.

23. The apparatus of claim 20, further comprising:

the housing having an interior surface with a plurality of axially extending ribs that project radially inwardly from the housing interior surface and engage with the stator holding the stator spaced radially inwardly from the housing side wall, the ribs defining a plurality of axially extending air flow channels between the stator and the side wall and the plurality of vent holes being axially aligned with the plurality of air flow channels.

24. The apparatus of claim 20, further comprising:

there being no other vent holes through the second end wall apart for the plurality of vent holes that each pass through the second end wall and the side wall of the housing where the second end wall is connected to the side wall.

25. The apparatus of claim 20, further comprising:

a plurality of outlet vent holes through the first end wall arranged in a circular pattern around the electrical device shaft;

the plurality of vent holes through the second end wall are a plurality of inlet vent holes; and the housing having an interior surface with a plurality of axially extending ribs that project radially inwardly from the housing interior surface and engage with the stator holding the stator spaced radially inwardly from the housing side wall, the ribs defining a plurality of axially extending air flow channels between the stator and the side wall, the plurality of inlet vent holes being axially aligned with the plurality of air flow channels, and the plurality of air flow channels defining portions of a plurality of cooling air paths through the housing interior volume from the plurality of inlet vent holes arranged around an outer periphery of a first set of stator winding end turns adjacent the second end wall, the air path extending axially through the plurality of air flow channels across an outer periphery of the stator and then extending radially inwardly across a second set of the stator winding end turns toward the plurality of outlet vent holes arranged around the electrical device shaft and exiting the housing interior volume through the plurality of outlet vent holes.

26. The apparatus of claim 25, further comprising:

the electrical device shaft projects from the housing through the first end wall and a fan is mounted on the shaft exterior to the housing where operation of the electrical device causes the fan to draw cooling air through the housing from the plurality of inlet vent holes, through the plurality of air flow channels and out of the housing through the plurality of outlet vent holes.

27. An apparatus with optimized cooling comprising:

an electrical device having a rotating shaft with a center axis, the shaft center axis defining mutually perpendicular axial and radial directions relative to the electrical device, and a stator around the shaft, the stator having axially opposite ends and stator winding end turns at the axially opposite ends;

a housing having an interior volume containing the electrical device, the housing having a first end wall and a second end wall at axially opposite ends of the interior volume and a side wall connected between the first end wall and the second end wall and surrounding the interior volume, the first end wall having opposite interior and exterior surfaces with the interior surface opposing the interior volume of the housing and opposing stator winding end turns at one end of the stator with there being an axial spacing between the stator winding end turns and the first end wall interior surface, and the axial spacing between the stator winding end turns and the first end wall interior surface decreases as the spacing extends radially inwardly from an outer periphery of the stator winding end turns toward the center axis of the electrical device shaft.

28. The apparatus of claim 27, further comprising:

the spacing between the stator winding end turns and the first end wall interior surface extends completely around the electrical device shaft.

29. The apparatus of claim 27, further comprising:

the first end wall having a shaft hole and the electrical device shaft passing through the shaft hole, and the spacing between the stator winding end turns and the first end wall interior surface extending around the shaft hole.

30. The apparatus of claim 27, further comprising:
at least one vent hole passing through the first end wall, the axial spacing between the stator winding end turns and the first end wall interior surface extending around the vent hole.

31. The apparatus of claim 27, further comprising:
a plurality of vent holes through the housing, each vent hole passing through the second end wall and through the side wall where the second end wall is connected to the side wall.

32. The apparatus of claim 27, further comprising:
a plurality of vent holes through the second end wall of the housing with each vent hole being positioned radially outwardly from the stator winding end turns.

33. The apparatus of claim 31, further comprising:
the stator being spaced radially inwardly from the housing side wall defining an air path between the stator and the side wall and the air path communicating with the axial spacing between the stator winding end turns and the first end wall interior surface.

* * * * *